W. H. NOONEN.
VALVE NUT.
APPLICATION FILED MAR. 31, 1908.
905,566.
Patented Dec. 1, 1908.
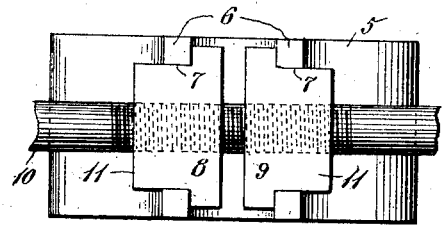
Fig. 1.
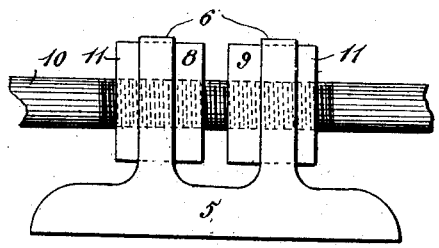
Fig. 2.
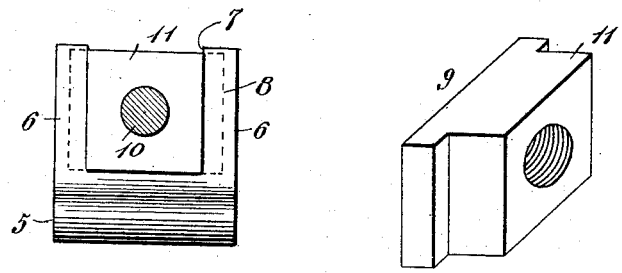
Fig. 3.
Fig. 4.
WITNESSES:
Agnes Quinn.
M. A. Schmidt.
Wm. H. Noonen
INVENTOR
BY
Attorneys.

UNITED STATES PATENT OFFICE.

WILLIAM H. NOONEN, OF BAKERSFIELD, CALIFORNIA.

VALVE-NUT.

No. 905,566.      Specification of Letters Patent.      Patented Dec. 1, 1908.

Application filed March 31, 1908. Serial No. 424,443.

*To all whom it may concern:*

Be it known that I, WILLIAM H. NOONEN, a citizen of the United States, residing at Bakersfield, in the county of Kern and State of California, have invented certain new and useful Improvements in Valve-Nuts, of which the following is a specification.

This invention relates to valve-nuts, or more particularly to the means whereby a slide-valve is fastened to its rod.

The object of the invention is to provide adjustable fastening means of this kind so that the stroke of the pump may be adjusted, and lost motion taken up when the valve and nut become worn.

The invention is more particularly designed for the slide-valves of steam pumps, but it is not limited thereto.

In the accompanying drawing, Figure 1 is a plan view showing the application of the invention. Fig. 2 is a side elevation. Fig. 3 is an end view. Fig. 4 is a perspective view of one of the nut-sections hereinafter referred to.

Referring specifically to the drawing, 5 denotes a slide-valve of ordinary construction, on the back of which are two spaced upstanding lugs 6 having recesses 7 extending downwardly from the top thereof. The ordinary method of fastening the valve-rod to the valve, is to use a single nut which fits between the lugs 6 and has reduced ends fitting the recesses 7. This method is objectionable as the nut cannot be adjusted to set the valve or to take up lost motion when the parts become worn.

The objection herein noted is entirely overcome by the present invention in which the nut is made in two sections which are indicated at 8 and 9 in the drawing. Both sections screw on the valve-rod 10. The main body of each nut-section is of greater width than the recesses 7, and each section also has at one end a reduced portion 11.

In use the main body portion of the nut-sections fit between the lugs 6, and as they are wider than the recesses they are confined therebetween and the valve is therefore compelled to move with the rod. The reduced ends 11 of the nut-sections fit in the recesses 7 as usual.

By unscrewing the valve-rod and spreading the nut-sections, lost motion may be taken up, and the valve can be set to regulate the stroke of the pump, whereby a great saving is effected as it is not necessary to throw away the valve-nuts when they become worn, and the pump can be kept in better working order.

Either nut can be adjusted one-half turn or more at a time, and a one-half turn will be sufficiently close to keep the pump in perfect working order. Thus a nut having the usual fourteen threads per inch may be adjusted to one-twenty-eighth of an inch, which would give one-fifty-sixth of an inch clearance on each side, which would be immaterial.

I claim:

The combination with a valve-rod, and a valve having spaced recessed lugs; of means for fastening the rod to the valve, comprising a pair of nuts screwed on the valve-rod and fitting between the lugs, and having reduced ends seating in the recesses of the lugs.

In testimony whereof I affix my signature, in presence of two witnesses.

WILLIAM H. NOONEN.

Witnesses:
    MATTHEW S. PLATZ,
    EDWARD D. GILLETTE.